United States Patent [19]
Wachob

[11] Patent Number: 4,841,569
[45] Date of Patent: Jun. 20, 1989

[54] SECURE VIDEO DISTRIBUTION SYSTEM

[75] Inventor: David E. Wachob, Elkins Park, Pa.

[73] Assignee: General Instrument Corporation, New York, N.Y.

[21] Appl. No.: 139,459

[22] Filed: Dec. 30, 1987

[51] Int. Cl.$^4$ .................. H04N 7/167; H04K 3/00
[52] U.S. Cl. .......................................... 380/7; 380/8; 455/1
[58] Field of Search .................. 380/7, 8, 20; 455/1

[56]  References Cited
U.S. PATENT DOCUMENTS

| | | |
|---|---|---|
| 3,175,033 | 3/1965 | Blonder et al. . |
| 3,202,758 | 8/1965 | Brownstein . |
| 3,347,982 | 10/1967 | Bass et al. . |
| 3,760,097 | 9/1973 | Burroughs et al. . |
| 3,896,262 | 7/1975 | Hudspeth et al. . |
| 4,074,311 | 2/1978 | Tanner et al. . |
| 4,623,918 | 11/1986 | Chomet ................................. 380/7 |

Primary Examiner—Stephen C. Buczinski
Attorney, Agent, or Firm—Hopgood, Calimafde, Kalil, Blaustein & Judlowe

[57] ABSTRACT

A video distribution system (e.g., CATV or MATV) employs at least one channel having a reception-defeating jamming signal which changes frequency periodically or, preferably, randomly. The signal originating head end distributes information characterizing the operative frequency of the jamming wave.

At controller apparatus for authorized viewers, the jamming frequency specifying data is employed on a frequency agile basis of heterodyne the protected channel into a proper (fixed) frequency relationship with a notch band suppression filter to remove the jamming signal. The secure channel with the jamming wave removed is then again shifted to its original or other intended frequency to permit normal reception either directly by a standard television receiver, or via a frequency converter.

16 Claims, 2 Drawing Sheets

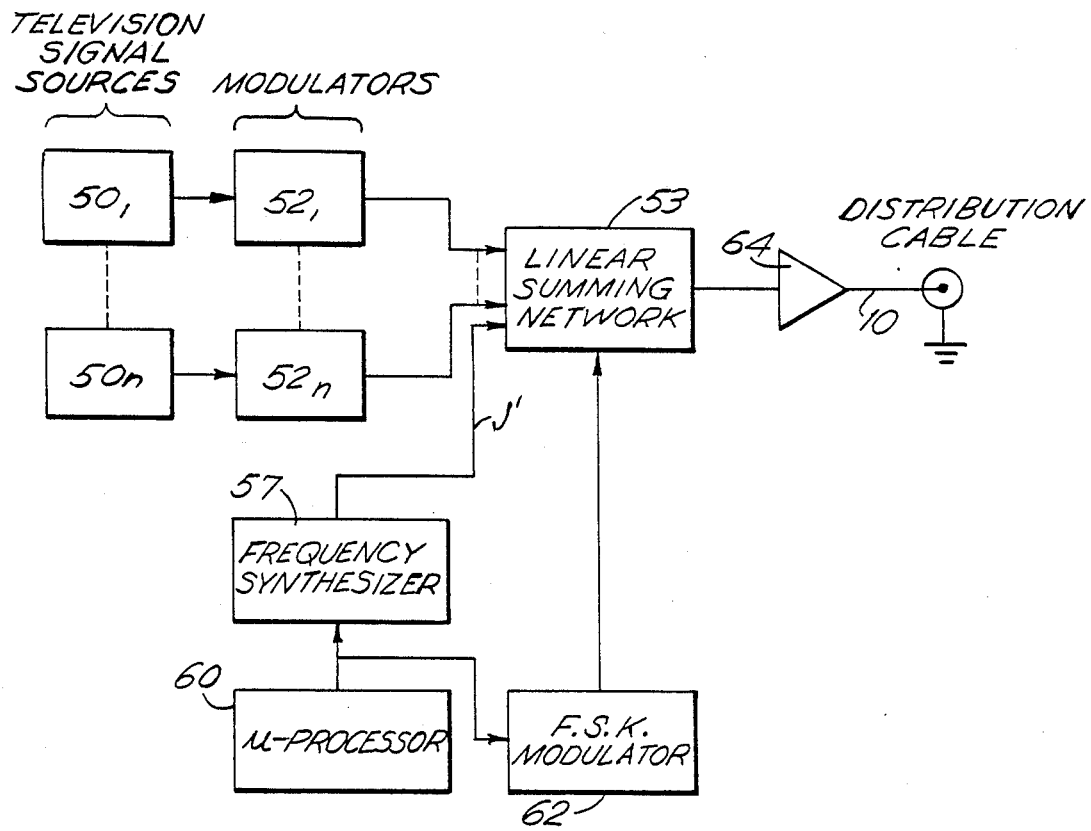
FIG. 1 (HEAD END)
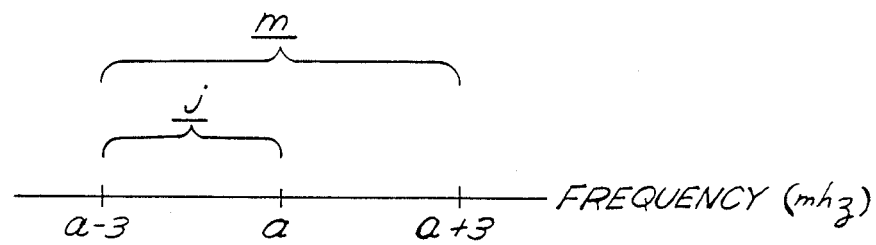
FIG. 3

SECURE VIDEO DISTRIBUTION SYSTEM

Disclosure of the Invention

This invention relates to electronic signal transmission and, more specifically, to a video distribution system which provides secure programming selectively available only to a restricted subset of system subscribers.

Background of the Invention

Video signal distribution applications, e.g., CATV or MATV systems, often employ selected channels which may be received only by selected, authorized subscriber/recipients. Thus, for example, tiered CATV systems employ a base video service available to all recipients; and premium signals (such as movies, theatre and/or sporting events) available only to subscribers who pay for and are authorized to view the additional programming. The extra subscriber authorization may be pre-arranged by subscription to extra program categories; or may be available on an impulse pay-per-view basis.

In such systems, a mechanism must be employed to disable viewing of the additional programming by unauthorized viewers. A number of such restrictive selective pay television systems have heretofore been employed. Included among such systems, a jamming signal has been employed within the frequency bounds of a video program to defeat tolerable reception. The jamming carrier prevents recovery of the synchronization signals required to reconstruct and display a television picture; and also per se represents video picture content interference. However, the difficulty exists that on an organized or ad hoc basis, unauthorized subscribers may employ a narrow-band filter to remove the jamming signal, thus permitting reception.

Objects of the Invention

It is an object of the present invention to provide an improved electronic signal distribution system.

More specifically, an object of the present invention is the provision of a CATV (or other signal distribution) system reliably preventing unauthorized signal reception via a reception-defeating jamming signal which varies in frequency and thus cannot be evaded by a fixed filter.

It is another object of the present invention to provide a secure CATV system which employs apparatus for selectively removing a reception-defeating jamming sinusoid; and which is physically disposed outside the subscriber's home.

Summary of the Invention

The above and other objects of the present invention are realized in a specific, illustrative video distribution (CATV or MATV) system employing at least one channel characterized by a reception-defeating jamming signal which changes frequency periodically or, preferably, randomly. The signal originating head end distributes information identifying the frequency of the jamming wave.

At controller apparatus for authorized viewers, the jamming frequency specifying data is employed on a frequency agile basis to heterodyne the protected channel into a proper (fixed) frequency relationship with a notch band suppression filter to remove the jamming signal. The secure channel with the jamming wave removed is then again shifted to its original or other intended frequency to permit normal reception either directly by a standard television receiver or via a frequency converter.

Description of the Drawing

The foregoing features and advantages of the present invention will become more clear from a specific, illustrative embodiment thereof, presented herein below in conjunction with the accompanying drawings, in which:

FIG. 1 is a block diagram of signal originating head end apparatus for providing the secure video transmission signals of the instant invention;

FIG. 3 displays a frequency spectra in accordance with the instant invention.

Figure 2:
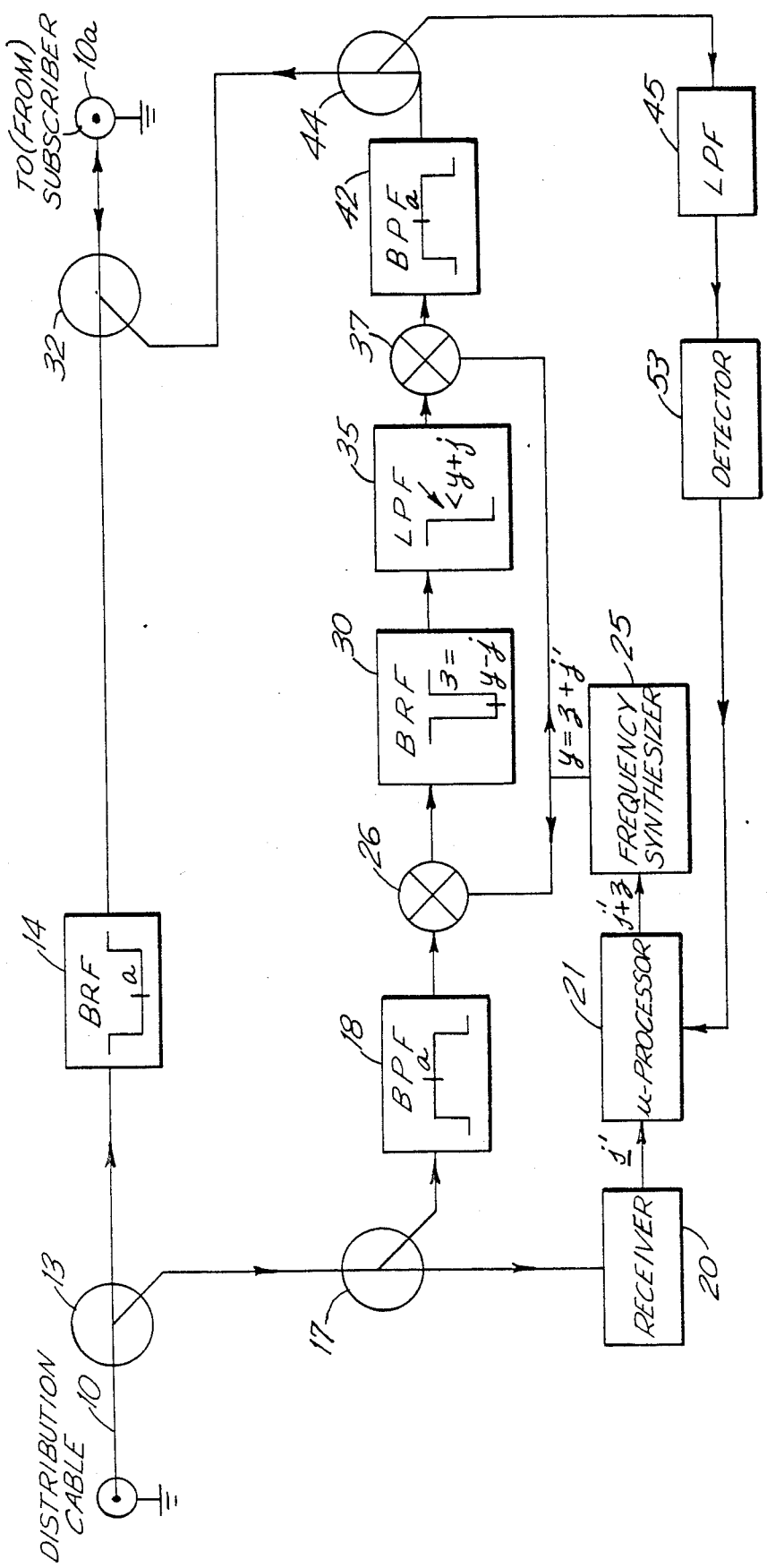
FIG. 2 is a block diagram of signal reception apparatus for the encrypted transmission of FIG. 1.

Discussing the invention first in overview, it is the purpose of the instant apparatus to provide for transmission and distribution of an array of video signals - as via a CATV or MATV cable (10 in FIGS. 1 and 2). Included in the signal distributed via the cable are a first subset of channels which are transmitted in the clear and which are destined for reception by all signal recipients connected to the distribution cable or the like. Also included in the ensemble of signals is at least one video program which is protected, i.e., which is destined for reception only by those cable-connected subscribers who are authorized to receive the protected program.

In its simplest form, and with respect to FIG. 3, assume that a system employs one premium or protected channel having the standard approximate 6 megahertz spectrum m roughly centered $\pm 3$ mhz about frequency a mhz. In addition to the normal picture and sound subcarriers and other video constituents, the head end transmits a jamming sinusoid within the frequency bounds $a \pm 3$ mhz of the protected channel. In prior art systems, the jamming signal would be transmitted at a fixed frequency giving rise to the possibility of purloined reception by a user who became equipped with a narrow band notch filter at the constant frequency of the jamming wave.

To defeat this possibility, in accordance with the principles of the present invention, a jamming signal is employed—but not of fixed frequency. Rather, the frequency of the jamming wave changes from time to time—either through the whole band $a \pm 3$ mhz or, preferably, within limited frequency bounds j proximate the picture carrier shown in FIG. 3. This prevents defeat of the jamming signal by a fixed frequency notch or band reject filter since the jamming carrier on a statistical basis will repose within the frequency of such a fixed filter only a very small percentage of the time.

The apparatus of the present invention obviously must provide apparatus to create the variable frequency jamming carrier at the head end—and to eliminate this varying frequency signal at the receiver. To this end, the head end apparatus varies the frequency of the jamming signal within the sub-frequency bounds j (or within the full frequency band m) from time to time. A predetermined frequency sequence may be employed, with predetermined timing. This would obviate the need for communicating un-jamming synchronizing information from the head end to the restoring subscriber equipment which may simply operate in accordance with the pre-specified frequency pattern which can be locally stored. Alternatively and preferably, a random number generator(s) at the head end may act in concert with a microprocessor to cause a random jamming frequency to obtain within the prescribed frequency bounds for the jamming signal (with random timing). The frequency assignment (and timing) is then transmitted by the head end to the signal restoring equipment—as by frequency shift keying (FSK) modulation on a system subcarrier, e.g., in the FM band; or in-band as via amplitude modulation on the audio subcarrier. The decrypting equipment at or nearby the subscriber locations receives the frequency and timing information from the subcarrier channel to permit decryption (jamming signal removal) in the manner described below.

At receiving locations a band reject filter blocks direct transmission to subscribers of the entire premium channel—and unintended upstream transmission of the decrypted clear signal. At such decrypting equipment, a jamming signal eliminating path is employed which includes a narrow, notch band rejecting filter of fixed frequency. The entire 6 mhz premium signal is then adjusted in frequency by frequency agile heterodyning apparatus such that the jamming frequency, wherever it then happens to be, will identically correspond in frequency to the frequency of the notch filter. Once the jamming signal is removed by the notch filter, a second heterodyning process restores the entire premium program—with the jamming signal removed, to its original or other intended spectrum for direct recovery and display by either a standard television receiver, or by an intermediate frequency converter. A frequency agile synthesizer is employed for the two heterodyning operations in the jamming signal eliminating path, under control of the jamming signal frequency information provided by the FSK modulation (or other frequency communications path) to maintain the frequency correspondence between the time varying frequency of the jamming wave and the fixed frequency of the band reject filter. Accordingly, reception by individual subscribers of the protected premium program is dictated by operative available jamming signal removing circuitry.

The above description has assumed a single premium program. Jamming signals may be employed in a plurality of protected premium channels, where jamming occurs on a time division (i.e., time-interleaved) basis. The premium program then transporting the jamming sinusoid is appropriately positioned with respect to the fixed frequency band rejecting filter such that all programs are delivered clear for reception.

With the above system overview in mind, specific reference is now made to the video distribution head end shown in FIG. 1. A plurality of television signal sources $50_1, \ldots, 50_n$ supply differing television programs to a respective one of an array of modulators $52_1, \ldots, 52_n$ the outputs of which are linearly combined in a summing network or combiner 53. Assume that one of the television signal sources $50_i$, with its following modulator $52_i$, correspond to a video program for which access is to be restricted. Further assume that the post-modulation band for the protected program is centered about the frequency a. Since a television signal is approximately 6 megahertz wide, the band of the protected signal is substantially $a-3$ to $a+3$ megahertz.

A microprocessor 60 is employed at the head end and controls a frequency synthesizer 57. In particular, the microprocessor 60 supplies a digital control word to the frequency synthesizer 57 which governs its output frequency in a manner per se well known for such devices. The output of synthesizer 57 is a sinusoid of frequency j' within the band $a\pm3$ mhz (or the lesser range j of FIG. 3) thereby jamming reception of the premium program. The output frequency is also supplied to a frequency shift key modulator 62 which thus supplies a signal identifying the jamming frequency. The microprocessor 60 changes its control word to synthesizer 57 and modulator 62 from time to time to alter the frequency of the jamming sinusoid—as in accordance with the output of a random number generator presumed internal to the microprocessor 60 but which may be implemented by a device external thereto.

The television programs at the output of modulators $52_1, \ldots, 52_n$, the jamming sinusoid from synthesizer 57, and the jamming frequency signalling band output of FSK modulator 62 are all supplied to the linear summing network 53 where they are combined. The combined signals are applied via a cable driver 64 onto the distribution cable network 10. Cable network 10 includes trunk, branch and other network constituents to disseminate the ensemble of head end signals to each of the system subscribers.

A system subscriber directly connected to distribution cable 10 can directly receive all clear channels. However, such a subscriber may not receive the protected signal in the i-th channel because the time varying jamming carrier will prevent reception.

At those system subscriber locations where reception of the premium programming is permitted, decrypting apparatus shown in FIG. 2 is employed. The FIG. 2 decryption structure may b employed within the subscriber's home as part of a converter or other terminal equipment. Preferably, however, such apparatus is located outside the subscriber's home under control of the system proprietor for enhanced security.

Considering now the FIG. 2 decryption apparatus, the head end distributed signal on cable 10 passes through a signal splitter 13 to a band reject filter 14 at least $a\pm3$ mhz wide so that the entire premium signal spectrum m (FIG. 3) is blocked. All clear channels (i.e., all frequencies outside $a\pm3$ mhz) pass through combiner/splitter 32 for delivery to the subscriber via the cable run 10a.

The incoming signal from the distribution cable 10 also passes through the lower branch of splitter 13 and through a splitter 17 to a receiver 20 which effects FSK demodulation. The receiver 20 thus communicates the jamming frequency j' then in use at the head end to a microprocessor 21. Microprocessor 21 appropriately controls a frequency synthesizer 25 to supply an output frequency y, the value of which will be described below.

The signal on cable 10 is also passed by splitters 13 and 17 to a band pass filter 18 which passes the $a\pm3$ mhz premium signal of band m (FIG. 3) to a balanced mixer 26 which also receives frequency y from synthesizer 25. The output of mixer 26 is supplied to a narrow band notch filter 30 which rejects frequencies at and very close to a value z megahertz. The microprocessor 21 controls the output frequency y of synthesizer 25 to be of a value $y=z+j'$ where as above noted j' is the instantaneous frequency of the jamming wave as signalled by receiver 20 from the head end frequency synchronizing path. Accordingly, selecting the lower (difference) band of the heterodyning process, the output of mixer 26 shifts the center frequency of the premium channel a to a value y−a. More importantly, the jamming signal j is heterodyned to a value y−j'. Since y=z+j', the jamming sinusoid now appears at $$y-j'=(z+j')-j'=z \text{ mhz}, \quad (1)$$

i.e., at the frequency z of the notch filter 30 and stays there whatever the jamming frequency j'. Thus, the heterodyning process operates on a frequency agile basis changing the mixer input y to precisely that value z+j' which is required to eliminate the jamming carrier. The above-described apparatus thus tracks and rejects the changing frequency jamming signal, creating a lower heterodyne band y−a−3 to y−a+3 mhz free of the jamming signal at the output of narrow notch filter 30.

A low pass filter 35 rejects all heterodyning products other than the difference band. The selected lower or difference band centered around y−a mhz undergoes a second heterodyne process at a mixer 37 which may also use the frequency y. Again selecting the difference frequency band:

$$y-(y-a)=a \text{ mhz} \quad (2)$$

in a band pass filter 42 centered around the initial center frequency a, the protected signal is restored to its original spectrum (a±3 mhz) where it passes through splitter/combiners 44 and 32 in clear form suitable for reception by the subscriber connected to the cable run 10a. Any offset may be algebraically added to y, if desired, to deliver the decrypted protected channel (sans interference sinusoid) at a vacated spectrum allocation different from its position on the cable 10 if desired.

The system of FIGS. 1 and 2 has thus been shown to provide a frequency varying jamming signal which defeats unauthorized reception. Where reception is permitted, the FIG. 2 apparatus removes the jamming signal on a frequency agile basis to restore the protected channel to clear form suitable for reception.

The above discussion has considered the case of one protected channel. A plurality of such channels can be implemented with one in-band interference carrier shared between channels on a time multiplexed basis, i.e., where the head end impresses a jamming signal within the band of one of the encrypted channels at a time. The filters 14, 18 and 42 are made sufficiently wide to pass or block as appropriate the contunguous array of protected channels; and the remainder of FIG. 2 will automatically operate in the manner abovediscussed to automatically put the jamming signal (in whatever channel and at whatever frequency) at frequency z mhz for removal by filter 30 to provide all channels on a clear basis.

The foregoing discussion has assumed permanent authorization of the protected channel to subscribers connected to FIG. 2 equipment. The FIG. 2 apparatus may alternatively be operated on an impulse, pay-per-view basis where the subscriber must signal a desire to receive a program. This request signal, for example in the form of a predetermined modulation on a sub-band signal, passes on cable run 10a through splitters 32 and 44 and through a low pass filter 45 to a detector 53. When detector 53 notes a service request, it appropriately signals microprocessor 21 as at a processor input or interrupt port. The processor 21 responds by passing the received frequency information j' to synthesizer 25 to effect channel reception enablement in the manner above described.

Again, the FIG. 1 and FIG. 2 apparatus has thus been shown to flexibly and reliably provide one or more protected channels together with one or more clear channels for video signal distribution.

The above described arrangement(s) are merely illustrative of the principals of the present invention. Numerous modifications and adaptations of the instant invention will be readily apparent to those skilled in the art without departing from the spirit and scope of this invention. Thus, for example, and in addition to the variations above-described, the frequency agile jamming of the instant invention may be employed for signals other than video programming.

What is claimed is:

1. In combination in apparatus for electronically restoring a video program which includes an in-band jamming wave characterized by a time varying frequency, means for receiving the jammed video program, a band reject filter, heterodyning means having first and second inputs and an output connected to said band reject filter; said receiving means coupling the video program having the variable frequency jamming wave to said first input of said heterodyning means, and means for supplying to said second input of said heterodyning means a signal of time varying frequency appropriate to heterodyne the changing frequency of the jamming signal to that of the band reject filter.

2. A combination as in claim 1, further comprising second heterodyning means for varying the output frequency of the signal passing through said band reject filter.

3. A combination as in claim 2, wherein said band reject filter is of fixed frequency.

4. A combination as in claim 2, wherein said time varying frequency signal supplying means comprises frequency agile frequency synthesizer means.

5. A combination as in claim 4, further comprising head end means for supplying the jamming wave including video program.

6. A combination as in claim 5, wherein said head end means includes means for communicating the operative frequency of said jamming wave, said restoring apparatus further comprising means responsive to the jamming wave frequency supplied by said jamming wave frequency communicating means for controlling the frequency of said frequency synthesizer means.

7. A combination as in claim 4, wherein said band reject filter has a rejection frequency z, the jamming wave has a frequency j', and said frequency agile frequency synthesizer means an output frequency z+j', where z and j' are independent positive numbers.

8. A combination as in claim 1, wherein said restoring apparatus further includes first band pass filter having sufficient frequency capacity to pass said video program connected to said first input of said heterodyning means.

9. A combination as in claim 8, wherein said restoring apparatus further comprises additional heterodyne means having an input connected to said band reject filter and an output, and second band pass filter means having sufficient frequency capacity to pass said video program connected to said output of said additional heterodyne means.

10. A combination as in claim 1, further comprising viewer-actuated demand signalling means for selectively enabling operation of said heterodyne means.

11. A combination as in claim 5, wherein said head end means supplies plural video programs having a jamming wave of varying frequency in a time-changing one of said programs.

12. In apparatus for recovering an electronic signal which includes a frequency varying jamming signal, a band reject filter of fixed frequency, heterodyning means having first and second inputs and an output connected to said fixed frequency filter; means for supplying the signal having the variable frequency jamming signal to said first input of said heterodyning means, and means for supplying to said second input of said heterodyning means a wave of time varying frequency of appropriate value to shift the then-obtaining frequency of the jamming signal to that of the fixed band reject filter.

13. A combination as in claim 12, further comprising second heterodyning means for varying the output frequency of the signal passing through said band reject filter.

14. A combination as in claim 13, wherein said heterodyne wave supplying means comprises frequency agile frequency synthesizer means.

15. A combination as in claim 14, further comprising signal origination means for supplying the jamming signal including electronic signal.

16. A combination as in claim 15, wherein said signal origination means includes means for communicating the operative frequency of said jamming signal, said recovering apparatus further comprising means responsive to the jamming signal frequency supplied by said jamming signal communicating means for controlling the frequency of said frequency synthesizer means.

* * * * *